United States Patent [19]

Freilich

[11] Patent Number: 5,311,356
[45] Date of Patent: May 10, 1994

[54] APPARATUS FOR SIMULATING EFFECTS OF OPTICAL LENSES AND METHODS FOR PRODUCTION AND USE

[76] Inventor: Joshua Freilich, Tano Point La., Santa Fe, N. Mex. 87501

[21] Appl. No.: 831,463

[22] Filed: Feb. 5, 1992

[51] Int. Cl.$^5$ ............... G02B 27/22; G02B 27/02; G02C 7/02
[52] U.S. Cl. ................ 359/467; 351/159; 351/177; 359/480
[58] Field of Search .......... 359/718, 480, 467, 466; 351/159, 177

[56] References Cited

U.S. PATENT DOCUMENTS 2,511,334  6/1950  Gruber ......................... 359/467
4,474,437  10/1984  Gorenstein .................... 359/718

OTHER PUBLICATIONS

Exhibit A–"Previews" Advertisement published as self-mailer to clients Aug. 1991.
Exhibit B–"Previews" Advertisement published with literature packets Apr. 1991.
Exhibit C–"Previews" page is reverse side of Advertisement identified as Exhibit A mailed Aug. 1991.
Exhibit D–Advertisement from May 13, 1991 issue of *VisionMonday*, Jolson Publishing Co.
Exhibit E–"Preview Advertisement" published as self-mailed to clients Aug. 1991.
Exhibit F–Photograph used in brochures, fryers and ads used as early as Jul. 1991.

*Primary Examiner*—Scott J. Sugarman
*Attorney, Agent, or Firm*—Rod D. Baker; Deborah A. Peacock

[57] ABSTRACT

Apparatuses, and methods for their production and use, with which the visual effects of optical lenses can be accurately and credibly simulated. The invention permits the simulation of the visual effects of specialized eyeglass lenses, such as polarized, tinted, or photoreactive lenses. The user confidently can compare, contrast, and evaluate an assortment of specialized eyeglass lenses potentially meeting the user's need and wants, as well as compare and contrast the use and non-use of specialized eyeglass lenses.

58 Claims, 2 Drawing Sheets

APPARATUS FOR SIMULATING EFFECTS OF OPTICAL LENSES AND METHODS FOR PRODUCTION AND USE

BACKGROUND OF THE INVENTION

1. Field of the Invention (Technical Field)

This invention relates to apparatuses for simulating the effects of optical lenses, and methods for production and use.

2. Description of the Related Art

There is a need in the optical products industry for a simple and convenient means for simulating the visual effects of using a variety of optical lenses. The need is most apparent in the retail eyeglasses sales industry. It is generally acknowledged among opticians and optometrists that sales volume and customer satisfaction are substantially increased when the optical products customer is able to accurately experience first-hand the visual effect of using a particular type of optical lens. Thus, the apparatuses and methods of the present invention shall have ready application in the eyeglasses sales and service industry; the invention may be practiced in a variety of commercial and industrial contexts, however, and is not limited to retail eyeglasses sales.

Modern optical sciences provide a wide variety of both prescription and non-prescription specialized eyeglass lenses. Specialized eyeglass lenses incorporate various combinations of polarized and photo-reactive compounds, tintings, coatings and other treatment techniques in order to produce lenses specially adapted for use under particular environmental conditions. Specialized eyeglass lenses are frequently, but not necessarily, prescription lenses for correcting the wearer's individual visual handicap. Specialized eyeglass lenses are typically of the type mounted within eyeglasses frames, but may also be contact lenses for use in direct contact with the eye itself.

Selection and purchase of prescription and non-prescription specialized eyeglass lenses normally occurs in an optician's indoor retail sales outlet. Corrective lenses are ordered with reference to an optometrist's or ophthalmologist's written prescription. Matching a customer's additional specialized eyeglass lens needs (e.g., tinting or polarization) with available products, however, is usually a joint undertaking between the customer and the specialized eyeglass lens provider. The specialized eyeglass lens provider is normally an optician, optometrist, or sunglasses retailer.

Presently, the common practice in the art is to use standard photographic prints mounted upon cardboard placards, or, alternatively, printed in magazines or brochures, in order to simulate the use of a given specialized eyeglass lens type. Typically, an outdoor scene is photographed and a color print is produced using standard photographic techniques. The print is then retouched or otherwise graphically manipulated to simulate the visual effect the use of the particular specialized eyeglass lens would have upon the view of the scene depicted. The retouched print is mounted upon a cardboard placard or otherwise printed for demonstration purposes. The customer or other potential user of the particular specialized eyeglass lens then views the print in order to perceive the simulated effect of the particular lens.

The use of placard-mounted prints, however, frequently results in an inaccurate depiction of the effect of a particular specialized eyeglass lens upon the viewing experience. Due to variations in paper quality, photographic processing, retouching methods, and print quality, photographic prints often render an untrue reproduction of the visual impact of the use of the specialized eyeglass lens under natural lighting conditions. Also, ambient lighting (usually artificial) reflecting off of prints alters the appearance of a print's colors. Moreover, photographic prints are unable to portray the three-dimensional nature of a visual experience. Consequently, the use of photographic prints does not result in accurate, credible, or convincing simulations of the use of specialized lenses. This lack of visual impact and fidelity dramatically hampers the marketing and beneficial use of specialized eyeglass lens products.

A number of optical supply distributors have an on-premises source of ultraviolet light for use in demonstrating the effect of sunlight upon photoreactive lenses. These demonstrations merely allow the potential user to witness, from some distance, a sample lens' color change in response to ultraviolet light; the potential user at no time actually views any scene through the photoreactive lenses.

SUMMARY OF THE INVENTION (DISCLOSURE OF THE INVENTION)

This invention relates to apparatuses for simulating the effect of optical lenses, and methods for making and using such apparatuses. The apparatus comprises one or more transparencies of an image photographed through a preselected optical lens, with means for illuminating and displaying the transparency for visual inspection by the user. The transparency is mounted for viewing, either in a slide or preferably in a disk suitable for use in a View Master®-type binocular viewing apparatus. The image photographed is preselected based on a user characteristic, such as user age, user life-style, user vocation, user avocation, user income level, or the user's particular optic health (such as past cataract surgery, hypersensitivity to ultraviolet light, etc.).

The preselected optical lens used in the image photography corresponds to a specialized lens incorporating one or more beneficial features. For example, but not by limitation, beneficial features include polarization, tinting, and photoreactivity. The preselected optical lens used to photograph a particular image also is selected based upon user characteristics. More than one preselected optical lens may be used to photograph a given image.

The images thus photographed are developed upon photographic transparencies, as previously described. Using knowledge common in the art, a user of the apparatus of the invention is matched to one or more transparencies based upon that particular user's personal characteristics. For example, a young user with a user avocation of skiing may be matched to a transparency of a scene depicting a snow-covered slope, photographed through a blue-tinted, polarized specialized lens. Using the apparatus of the invention, the user is then able to experience the simulated visual effect of the specialized lens used to produce each of one or more transparencies. Importantly, it is also an object of the present invention to provide transparencies corresponding to the lack of any specialized lenses, thus allowing the user to contrast the use of specialized lenses with the use of no lenses at all.

In the preferred, binocular embodiment of the viewing apparatus of the invention, the user employs a View-master-type disk to view a simulated three-dimensional transparency image, thus enhancing the viewing experience and improving image fidelity. The preferred embodiment of the viewing apparatus permits consecutive viewing of different transparencies, which in turn encourages the user to compare and contrast differing specialized lens types, or to contrast use and non-use of specialized lenses under assorted lighting conditions. The preferred embodiment of the viewing apparatus also includes a base component, containing bins for holding the viewer and transparencies when not in use.

Alternatively, the user may employ a light tray permitting simultaneous comparison of different transparencies. The light tray apparatus allows the user to simultaneously compare two or more transparencies by disposing them upon a translucent cover located above a source of light.

The apparatuses and methods of the invention also include means and steps for supplying the user with lens identifying indicia informing the user about the transparency he is viewing at any given time.

The methods of the invention also include the steps of attaching specialized lenses, both singly and in combination, to a camera and then photographing images through the specialized lenses. By photographing a single image or scene more than one time through different specialized lenses (including the use of a neutral lens or no specialized lens at all), pairs or combinations of transparencies of the same scene may be produced which permit the user to compare and contrast the benefits of specialized lenses.

Thus, it is the primary object of the present invention to provide an apparatus for easily and accurately simulating the visual effects of optical lenses.

It is the further object of the present invention to provide a method for using an apparatus for easily and accurately simulating the visual effects of optical lenses under natural lighting conditions.

It is another object of the present invention to provide an apparatus for facilitating the matching of specialized eyeglass lenses to particular user characteristics.

It is another object of the present invention to provide an apparatus for simulating the visual effects of specialized eyeglass lenses which is easy and entertaining to use.

It is another object of the present invention to provide an apparatus for simulating the visual effects of optical lenses which permits the user to experience in a short period of time the simulated visual effects of a variety of specialized eyeglass lens types under a variety of environmental conditions.

An advantage of the apparatus of the present invention is that it permits the user to experience an accurate simulation of the optical benefits of a variety of lens types under varying environmental conditions.

Another advantage of the present invention is that it is easily used without specialized training or experience.

Another advantage of the present invention is that it facilitates the matching of particular eyeglass lens types with the life-style of the individual user.

Another advantage of the present invention is that it relates to an apparatus that is portable and easily stored when not in use.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are to be construed as limiting the invention.

DESCRIPTION OF THE PREFERRED EMBODIMENT (BEST MODE FOR CARRYING OUT THE INVENTION)

The present invention relates to apparatuses for simulating the effects of optical lenses, methods for making such apparatuses, and methods for their use. The apparatuses, while designed primarily for use in retail optical sales outlets, may be more widely practiced. They may be beneficially used in optical lens research and development, corporate marketing planning in the optical industry, and consumer polling and market research.

Figure 1:
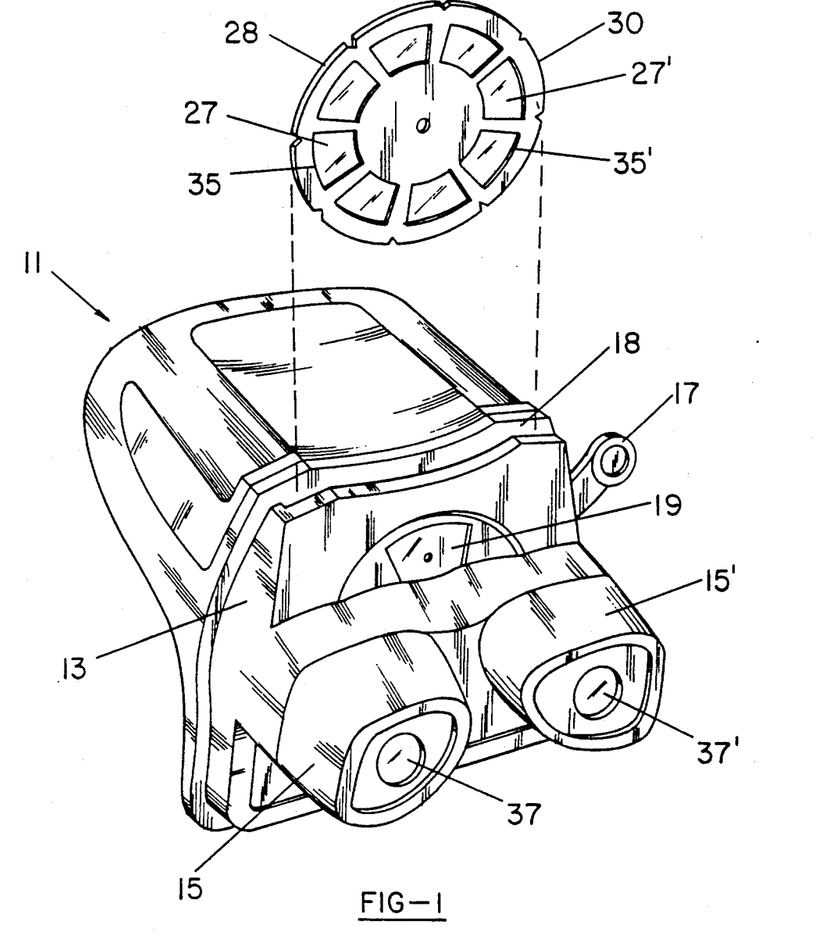
FIG. 1 is a perspective view of the front of the preferred View-Master ®-type binocular viewing apparatus and of the preferred View-Master ® viewing disk embodiment of the invention.
Figure 2:
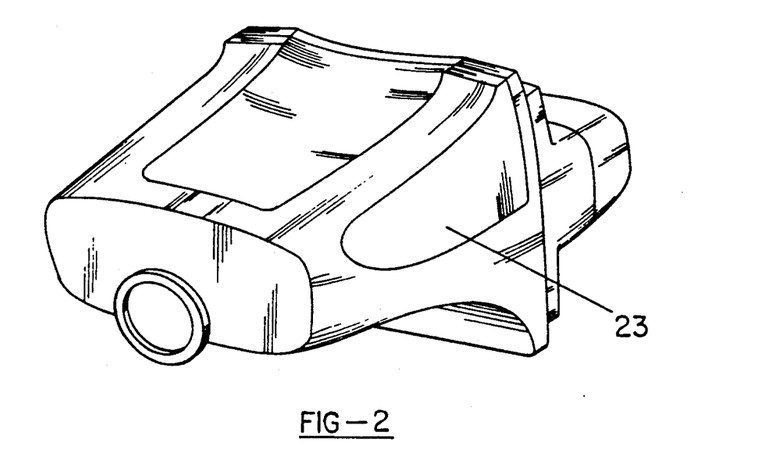
FIG. 2 is a perspective view of the back of the FIG. 1 embodiment.

Reference is made to FIGS. 1 and 2 of the drawings which show the preferred embodiment of the viewing apparatus of the invention. The viewer 11 generally comprises a housing 13, two eyepieces 15 and 15', advancement lever 17, disk receiving slot 18, and lens indicia window 19. Not shown are advancement mechanism and light bulbs, which are disposed within the interior of the housing 13. An apparatus substantially similar to the viewer 11, as described, is available, under the trademark View-master, a product of VIEW-MASTER Ideal Group, Inc.

The housing 13 is composed of plastic or any other suitable lightweight, durable material. Housing 13 is shaped in a fashion as to make the viewer 11 easily held in the user's hands; in the preferred embodiment the sides of the viewer are curved to form grips 23. In the preferred embodiment, housing 13 comprises two eyepieces 15, 15', which permit binocular viewing through the viewer 11. Mounted within eyepieces 15, 15' are magnifying lenses 37, 37'. magnifying lenses 37, 37' alternatively may be mounted deep within the interior of the eyepieces 15, 15' so as to be invisible to the casual observer of the viewer 11.

On the top of viewer 11 is a disk receiving slot 18 in housing 13. Disk receiving slot 18 is located within housing 13 so as to permit the vertical insertion of viewing disk 30 through the housing wall into a position immediately adjacent to eyepieces 15, 15'. It is understood that disk receiving slot 18 extends through the viewer 11 nearly to the bottom of viewer 11, so that a fully inserted viewing disk 30 is almost completely contained within the housing 13.

Specific reference is now made to FIG. 1, which illustrates the preferred embodiment of the viewing disk 30. Preferably, at least one pair of photographic disk transparency images 27, 27' is mounted within viewing disk 30. Viewing disk 30 is preferably of laminate structure, wherein a round sheet of photographic transparency film (not shown), bearing disk transparency images 27, 27', is concentrically sandwiched between two round opaque laminae 28 (only one shown). The opaque laminae 28, are made of cardboard, paperboard, plastic, or some other inexpensive material.

Disk transparency images 27, 27' occur in a regular pattern upon the transparency film, equidistant from the film's center and a small distance inside the film's circumference. Each pair of disk transparency images 27, 27' disposed upon a common diameter of the viewing disk 30 contain the same photographed scene. Thus, each viewing disk 30 contains pairs of disk transparency images 27, 27', located at diametrically opposed locations about the perimeter of the viewing disk 30, depicting the same scene. While of the same scene, disk transparency images 27, 27' are photographed using techniques known in the art (stereoscopic camera or optical image-splitter) to reproduce the optical parallax of human eyes, i.e. transparency image 27 is the particular scene as it would be seen through a person's left eye, and disk transparency image 27' is the same scene as it would simultaneously appear to the right eye. Thus, when viewed simultaneously through eyepieces 15, 15' in viewer 11, disk transparency images 27, 27' are combined by the user's brain into a single three-dimensional image. Both opaque laminae 28 are transected with image windows 35, 35'. It shall be understood that only one opaque lamina 28, with its pertinent image windows 35, 35', is illustrated in FIG. 1; an identical lamina is affixed to the posterior side of the viewing disk 30 as illustrated.

Image windows 35, 35' in both opaque laminae are aligned with one another and with corresponding disk transparency images 27, 27' so as to permit the passage of light through the disk transparency images 27, 27', which thereby permits the viewing of the disk transparency images 27, 27'. In the preferred embodiment, the viewing disk 30 comprises advancement notches 36 at regular intervals about its circumference. Viewing disks similar to that here described are manufactured under the trademark VIEW-MASTER, a product of View Master Ideal Group, Inc.

FIG. 1 shows the location of advancement lever 17 disposed on the side of viewer 11. Advancement lever 17 is mechanically linked to an advancement mechanism (not shown) disposed within the interior of the housing 13. Also disposed within housing 13 is a light source (not shown). In the preferred embodiment, the light source comprises halogen light bulbs located within the back portion of the housing 13, such that the disk receiving slot 18 is between the light source and the eyepieces 15, 15'. The light source preferably is powered by electricity received through a cord (not shown), which may be a standard dipole insulated appliance cord, or by battery.

FIG. 1 shows the functional relationship between viewing disk 30 and the viewer 11. Viewing disk 30 is inserted into disk receiving slot 18 until it is securely and vertically disposed within the viewer 11. When so inserted, the viewing disk is disposed such that disk transparency images 27, 27' are binocularly visible through respective eyepieces 15, 15'. The visibility of the disk transparency images is enhanced by backlighting provided by the light source. When inserted, viewing disk 30 is contacted by the advancement mechanism. The depression of the advancement lever 17 activates the advancement mechanism, causing the viewing disk 30 to rotate about its center. The rotation of viewing disk 30 by the advancement mechanism is incremental, such that each depression of the advancement lever 17 results in the rotation of the viewing disk 30 through a fixed angular distance equal to the angular distance between adjacent disk transparency images 27, 27'. Such incremental advancement permits consecutive viewing of adjacent disk transparency images about the circumference of the viewing disk 30.

Figure 3:
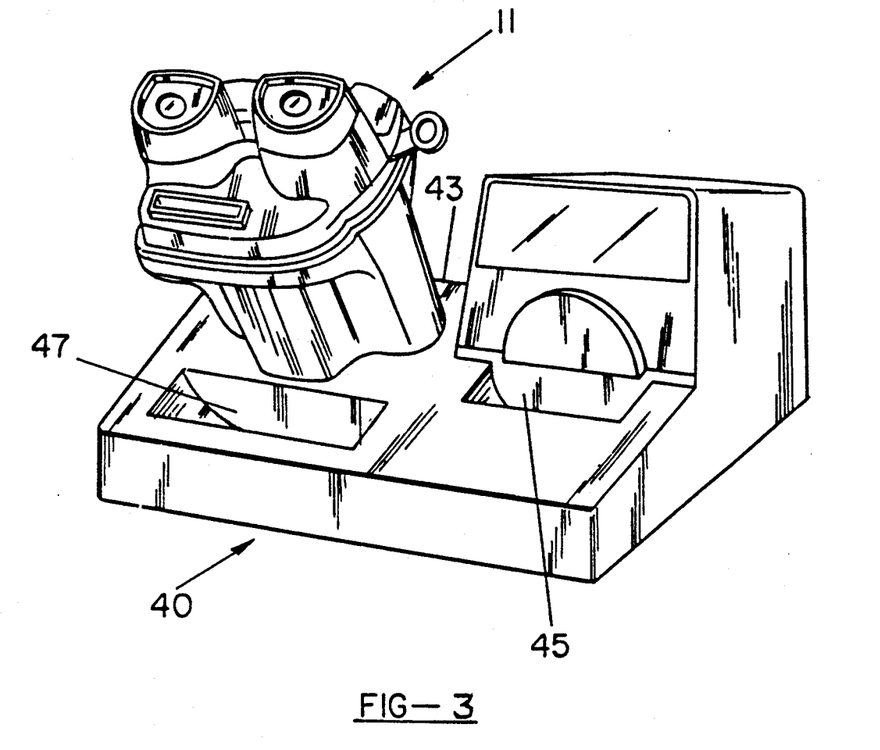
FIG. 3 is a perspective view of the front of the preferred embodiment of the apparatus of the invention, showing the FIG. 1 embodiment removably positionable within a base.

Reference is made to FIG. 3, showing the disposition of the viewer 11 within the storage base 40. Storage base 40 is made of injection molded or vacuum-formed plastic, hand-laid fiberglass, or other inexpensive and durable material. Storage base 40 comprises a concave viewer bin 43 shaped to accommodate the back of viewer 11. The dimensions of viewer bin 43 only slightly exceed the exterior dimensions of the back of viewer 11, such that when the back of viewer 11 is removably inserted into viewer bin 43, viewer 11 is held by friction securely in the position shown in FIG. 3. Storage base 40 permits the convenient storage of viewer 11 when viewer 11 is not in use. Alternatively, viewer 11 may be used while temporarily positioned within viewer bin 43.

With further reference to FIG. 3, it is seen that storage base 40 further comprises draw bin 45 and discard bin 47. Draw bin 45 is a concavity so shaped as to permit the orderly stacking of a plurality of viewing disks 30. Draw bin 45 is semi-cylindical, with a radius equal to the radius of viewing disk 30. Accordingly, draw bin 45 may be used effectively to store a plurality of viewing disks 30 vertically on edge, where they shall be within easy view and reach of the user.

Similarly, storage base 40 comprises discard bin 47. Discard bin 47 is also a concavity so shaped as to receive viewing disks 30 for safe and easy storage. Discard bin 45 is semi-cylindrical, with a radius equal to the radius of viewing disk 30. Discard bin 45 is located to permit the user easily to place a viewing disk 30 therein after use within the viewer 11.

Storage base 40 also comprises power cord (not shown) to supply electrical power to storage base 40. A second power cord (not shown) in turn conveys electrical power from storage base 40 to viewer 11 for lighting purposes.

Figure 4:
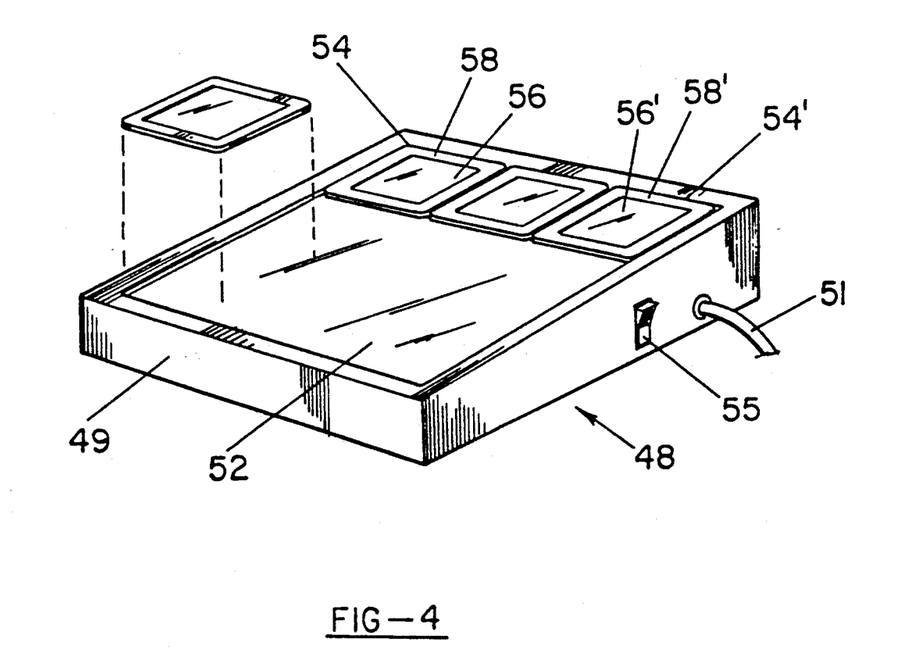
FIG. 4 is a perspective view of the front of an alternative embodiment of the apparatus of the invention, illustrating a light tray and viewing slide embodiment.

FIG. 4 shows an alternative embodiment of the viewing apparatus of the invention. The figure shows a light tray 48. Light tray 48 comprises light box 49, within which is disposed a light source (not shown), preferably a plurality of light bulbs. Light bulbs are preferably incandescent, but fluorescent lighting may also be utilized with acceptable results. Light source is powered by electricity received through an electrical cord 51 or battery. Electrical flow may be controlled by a switch 55. The top surface of light tray 48 comprises a planar translucent cover 52 made of glass or plastic. The translucence of the translucent cover 52 allows the diffused transmission of light from the light source to the exterior of the light box 49.

Also shown in FIG. 4 is viewing slide 54, 54' comprised of a photographic slide transparency image 56, 56' mounted within a durable frame 58, 58'. Durable frame 58 is made of plastic or cardboard or other inexpensive, durable material.

FIG. 4 illustrates the functional relationship between viewing slide 54, 54' and light tray 48. Viewing slide 54, 54' is placed upon the translucent cover 52 of the light box 49 so that the durable frame 58, 58' is parallel to translucent cover 52. It is understood that when activated, the light source passes diffused light through translucent cover 52 and through slide transparency image 56, 56', thus illuminating the slide transparency image 56, 56' and permitting its viewing by the user.

The invention is practiced primarily with the purpose of permitting the user to experience the simulated effect of wearing specialized eyeglass lenses in a sunlit environment. Specialized eyeglass lenses are eyeglass lenses or contact lenses that incorporate beneficial, usually optional, optical features in addition to basic corrective prescription. Beneficial optical features include, but are not limited to, polarization, tinting and photoreactivity. As used throughout the specification and claims, the terms "specialized lenses," "specialized eyeglass lenses," "optical lenses," "sunlenses" and "preselected lenses" are intended to cover all such lenses.

Beneficial optical features may be integrated into the lens through the addition of an admixture in the lens material, or may be added by application of a coating to the outside of the lens. Advances in eyeglass lens technology are constantly being made, and it is recognized that the use of practically any new or revolutionary beneficial specialized lens type may be simulated with the present invention. The use of properly selected specialized eyeglass lenses can dramatically increase eyesight acuity and user comfort. It is commonly known in the art that the use of polarized lenses by sailors, for example, enhances visual perception on or near water by blocking reflection and glare and reducing optic fatigue. It is likewise commonly known in the art that similar benefits may be reaped through the use of color-tinted or photoreactive lenses under certain other adverse viewing conditions. It shall be understood that any given specialized eyeglass lens may incorporate more than one beneficial optical feature. Desirable effects may be had, for example, by combining polarization with a colored tint. An illustrative, a non-limiting list of specialized eyeglass lenses includes lenses available under the following trademarks: Corning® SERENGETI DRIVERS, Corning® PHOTOGREY EXTRA, Corning® PHOTOBROWN EXTRA, Corning® CPF 527-S GLARE CONTROL, Bolle America, Inc. IREX 100, Ziari® Z:R150 TRUCOLOR, Bausch & Lomb® RAY-BAN G-15 Lenses, Schott® TAN CROWN, and Melibrad® POLAR-RAY GREY POLARIZED.

By practicing the invention, the user and the specialized eyeglass lens provider can select specialized eyeglass lenses matching the user's individual characteristics, such as age, life-style, vocation, avocation, income level, etc. By way of illustrative example, the apparatus of the invention can be used to demonstrate to an over-the-highway trucker the advantages of a specialized eyeglass lens which minimizes the irritating glare associated with nighttime driving, or perhaps, the desirability of a lens that enhances visual clarity while driving in a fog. Similarly, skiers can be shown how a specialized eyeglass lens can ease eyestrain in a snow-covered environment, and elderly users may find that a specialized eyeglass lens increases their reading comfort. A user who is in- and out-of- doors many times during a day can experience the simulated benefits of a photoreactive lens. It should be understood that while the present invention has a primary purpose of allowing the simulation of daytime outdoor use of specialized lenses, it is also possible to simulate nighttime or indoor use as well.

Preferably, the apparatus of invention is practiced by two individuals: the eyeglass lens provider and the user. Typically, but not necessarily, the user is a retail eyeglasses customer who has previously selected his or her eyeglasses frame style. The eyeglass lens provider is the optician-operator of a optical products dispensary, sporting goods store, sunglasses kiosk, and the like. The user's prescription lens needs, if any, is determined by an optometrist or ophthalmologist.

The photographic images on transparencies for use in either viewing disk 30 or viewing slide 44 are generated from images captured by a camera, preferably 50 mm, on photographic transparency film. The photographer is equipped with an assortment of specialized eyeglass lenses, or their optical equivalents, fixed within standard auxiliary camera lens mounts which allow one or more of the lenses to be removably attached on the front, or subject, side of a camera lens. Accordingly, when the photographer has located an appropriate subject to be photographed, he is capable of mounting one or more specialized eyeglass lenses in front of his camera lens prior to taking the photograph. An appropriate subject is any landscape scene or still life that logically may be associated with a given user characteristic. By way of example, a foggy highway scene is logically associated with a user vocation of truck driving, while a sunny surf scene is logically associated with a user avocation of scuba diving. Similarly, a floral still life could be an appropriate subject in the case of a user characteristic of old age, a sports scene could be an appropriate subject for a user characteristic of an athletic life-style, and a snow-covered landscape could be an appropriate subject for a user characteristic of a skiing avocation.

An appropriate subject is selected. A photograph of the appropriate subject is taken without the use of any specialized eyeglass lenses, such that the camera film records the image of the appropriate subject as it would appear to the naked eye.

One or more specialized eyeglass lenses adapted to the particular environmental lighting conditions of the subject to be photographed are then identified. The identified specialized eyeglass lenses are mounted singly or in coaxial combination upon the camera on the front of the camera lens. The identical or a substantially similar view of the same appropriate subject is then photographed through the specialized eyeglass lens using standard photographic techniques. The camera film thus records the image of the appropriate subject as it would appear when viewed through the specialized eyeglass lens attached to the camera at the time the photograph was taken. Care is taken at the time of photography to keep an accurate field record of the specialized eyeglass lenses used in connection with the photography of a particular appropriate subject.

Employing usual photographic developing techniques, companion or multiple related photographic transparencies are then produced: one transparency image of the appropriate subject photographed without the use of any specialized eyeglass lens, and one or more transparency images of the same appropriate subject photographed using one or more specialized eyeglass lenses, or combinations of specialized eyeglass lenses. Extra caution is observed during the film developing and transparency production processes in order to maintain consistency in process. Process consistency minimizes variations between transparency images of the same appropriate subject attributable to differences in process, but which appear in the final product to be due to variations in subject lighting conditions.

The method of the invention includes matching the user with a selection of specialized eyeglass lenses potentially satisfying the user's needs and demand. Ideally, the provider and the user discuss the user's work environment, hobbies, outdoor sports, general life-style, vision problems, and other user characteristics determinative of the user's frequently encountered environmental viewing conditions. Based on these user characteristics provided by the user, the provider can then recommend an assortment of specialized eyeglass lenses that may meet the user's indicated needs. The provider's knowledge of her product and her ability to relate specialized eyeglass lens features to given viewing conditions will be central to her ability to match specialty lenses with a given user.

Alternatively to, or in combination with, the provider's professional advice, the user may employ a specialized eyeglass lens selection aid. A specialized eyeglass lens selection aid comprises any means for processing and evaluating user characteristics to obtain a recommendation as to which specialized eyeglass lenses are well-suited to that user's needs. Examples of lens selection aids include simple computer programs and written flowcharts. A written lens selection aid flowchart may comprise a series of yes-no gates, whereby the user is queried in seriatum concerning his age, outdoor sports, indoor hobbies, time spent driving, etc. Depending upon the user's answers to the questions thus presented, the user at the end will be directed to a list of specialized eyeglass lenses suited to his or her needs. Similarly, various types of matrix charts can serve this function. The preparation of any functional lens selection aid will depend upon the application of knowledge common to the art regarding what adverse lighting conditions may be remedied by which beneficial optical features.

Alternatively, a lens selection aid may comprise a scored questionnaire, whereby the user's answers to a list of questions regarding life-style, job, hobbies, sports, age, driving habits, etc. will result in the identification of suitable specialized eyeglass lenses. A simple computer program, of course, also could readily process user characteristic data and generate output comprising proper specialized eyeglass lenses recommendations. A lens selection aid may also comprise a nomograph.

The matching of the user to appropriate specialized eyeglass lenses, whether accomplished by the provider, or by use of a lens selection aid, or both, is followed by the user's utilization of the apparatus of the invention in order to experience the simulated effects of one or more specialized eyeglass lenses. Typically, the user is seated at a table upon which the viewing apparatus of the invention is situated. The invention includes the viewmaster-type binocular embodiment of the viewing apparatus, or, alternatively, the light tray embodiment.

In the case of the View-Master ®-type binocular embodiment of the viewing apparatus, the storage base 40 and viewer 11 are placed before the user. Based upon the results of the matching process described above, the user is provided with one or more viewing disks 30 containing disk transparency images 27, 27' corresponding to the specialized eyeglass lenses matched to the user. When more than one viewing disk 30 is of interest to the user, excess viewing disks 30 may be temporarily stored in draw bin 45 pending use.

The user selects a viewing disk 30 of interest to him and inserts it into disk receiving slot 18. The light source is then activated, such that light passes through the disk transparency images 27, 27', through the magnifying lenses 37, 37', and out of the housing 13 via the eyepieces 15, 15'. By placing his eyes to the eyepieces 15, 15', the user is thus able to see a three-dimensional view of the image captured on the disk transparency images 27, 27'. Viewer 11 may be used while held by grips 23, 23' in the user's hands, or alternatively while positioned within the viewer bin 43 in the storage base 40, as illustrated in FIG. 3. It is thus seen that an advantage of the present invention is that the View-Master ®-type binocular embodiment of the viewing apparatus allows the user to perceive a three-dimensional image, and consequently, a more realistic and impressive simulation of the effects of specialized eyeglass lenses. Also, because the user's eyes are shielded from ambient lighting conditions by eyepieces 15, 15' and are responding only to the apparatus light source, quality of the simulation is enhanced.

The user may consecutively view successive disk transparency images 27, 27' by depressing the advancement lever 17. Each depression of advancement lever 17 causes advancement mechanism to engage advancement notches 36 in viewing disk 30, in turn causing viewing disk 30 to rotate about its center and thereby bringing successive pairs of disk transparency images 27, 27' into visual alignment with the light source, magnifying lenses 37, 37', and eyepieces 15, 15' for viewing by the user. Using advancement lever 17, the user may view and review, as desired, all disk transparency images 27, 27' of a viewing disk 30. This advancement feature of the apparatus permits the user readily to contrast the effect of a specialized eyeglass lens with the absence of any eyeglass lens—or to compare and contrast the effects of two different types of specialized eyeglass lenses—upon the view of a particular scene or image. The user perceives the disk transparency images 27, 27' nearly as though he were actually at the scene itself—in three dimensions, under simulated corresponding lighting, location, and environmental conditions. By way of example, and not by limitation, a user who has an avocation of snow skiing may, by depressing advancement lever 17, successively view preselected pairs of image transparencies and thereby compare and contrast a sunlit, snowcovered mountainside as viewed without specialized eyeglass lenses and as viewed through a polarized, red-tinted specialized eyeglass lens.

Identifying information pertaining to a given disk transparency image 27, 27' (such as the name of the corresponding specialized eyeglass lens and a description of the simulated lighting environment) preferably is printed at the appropriate location upon viewing disk 30, such that when a disk transparency image 27, 27' is viewable through the eyepieces 15, 15', corresponding lens identifying indicia can be read through the lens indicia window 19. Alternatively, the identifying information pertaining to a particular disk transparency image 27, 27' may be imprinted, using common photographic developing techniques, directly upon the image transparency 27, 27' and thereby may be read through the eyepieces 15, 15'.

After viewing the disk transparencies image 27, 27' of a viewing disk 30, the user may remove viewing disk 30 from disk receiving slot 18 and place it in discard bin 47. Another suitable viewing disk 30 may then be selected and removed from the draw bin 45 and placed in disk receiving slot 18. The aforementioned viewing process is repeated with the second viewing disk 30. This process may then be repeated indefinitely with successive viewing disks 30 that have been suitably matched to the user.

Thus, it is understood that a user practicing the View-Master ®-type binocular embodiment of the viewing apparatus of the invention is able effectively to experience the simulated effects of various specialized eyeglass lenses in a variety of lighting and environmental conditions. Identifying specialized eyeglass lenses corresponding to user characteristics, matching the user to appropriate subjects, and then accordingly selecting appropriate disk transparency images 27 and 27' and viewing disks 30 permits the user to experience a credible and convincing simulation of the use of specialized eyeglass lenses.

After the matching of the user to appropriate specialized eyeglass lenses, as hereinbefore described, an alternative embodiment of the viewing apparatus of the invention, illustrated in FIG. 4, may be utilized to allow the user to experience the simulated effects of one or more specialized eyeglass lenses. Light tray 48 is placed upon a table. The user is comfortably seated at the table in front of light tray 48. The user is provided with one or more viewing slides 54, 54' containing slide transparency image 56, 56' corresponding to specialized eyeglass lenses matched to the user. The light source within light box 49 is turned on using switch 55. One or more viewing slides 54, 54' are then placed upon the translucent cover 52, where they are backlit by the light source. By thus practicing the invention, the user may view viewing slides 54, 54' one at a time, in seriatum, upon the light tray 48, or may place a plurality of viewing slides 54, 54' upon light tray 48 for side-by-side comparison or multiple simultaneous viewing.

Final transparencies image in the form of either disk transparency images, 27, 27', or slide transparency images, 56, 56', are then mounted within viewing disk 30 or viewing slide 54, respectively. Using information previously recorded at the time of photography, identification of the specialized eyeglass lens or lenses, or absence thereof, corresponding to each transparency image is affixed either to the transparency image, or the viewing disk 30, or the durable frame 48 of the viewing slide 54.

It will also be appreciated by one of ordinary skill in the art that many of the objects and advantages of the present invention may be accomplished through application of the foregoing inventive concepts to the use of electric slide projectors, computerized digital imagery, and other modes of storing and retrieving visual imagery.

Although the invention has been described with reference to these embodiments, other embodiments can achieve the same results. Variations and modifications of the present invention will be obvious to those skilled in the art and it is intended to cover in the appended claims all such modifications and equivalents.

What is claimed is:

1. An apparatus for simulating the visual effects of wearing specialized eyeglasses comprising:
    at least one transparency of an appropriate subject photographed with at least one non-refractive specialized eyeglass lens, wherein said specialized eyeglass lens is selected from the group consisting of polarized lenses, color-tinted lenses, partially tinted lenses, neutral lenses, and photoreactive lenses;
    lighting means for illuminating said transparency for visual inspection by a user; and
    means for displaying said transparency for visual inspection by a user.

2. An apparatus in accordance with claim 1 wherein said transparency comprises a mounted slide.

3. An apparatus in accordance with claim 2 wherein said mounted slide comprises a VIEW-MASTER disk.

4. An apparatus in accordance with claim 1 wherein said appropriate subject is preselected based on a user characteristic.

5. An apparatus in accordance with claim 4 wherein said user characteristic comprising a member selected from the group consisting of user age, user life-style, user vocation, user avocation, and user income level.

6. An apparatus in accordance with claim 1 wherein said specialized eyeglass lens is selected based on a user characteristic.

7. An apparatus in accordance with claim 6 wherein said user characteristic comprises a member selected from the group comprising user age, user life-style, user vocation, user avocation, user income level, and user optic health.

8. An apparatus in accordance with claim 1 wherein said transparency simulates the effects of more than one specialized eyeglass lens.

9. An apparatus in accordance with claim 1 wherein said transparency further comprises lens identifying indicia.

10. An apparatus in accordance with claim 2 wherein said mounted slide further comprises lens identifying indicia.

11. An apparatus in accordance with claim 3 wherein said VIEW-MASTER disk further comprises lens identifying indicia.

12. An apparatus in accordance with claim 1 wherein said lighting means is disposed behind the transparency so that the transparency is between said lighting means and the user.

13. An apparatus in accordance with claim 1 wherein said lighting means comprises at least one light bulb.

14. An apparatus in accordance with claim 1 wherein said display means comprises means for projecting said transparency upon a screen.

15. An apparatus in accordance with claim 1 wherein said display means comprises means for adjacently disposing at least two transparencies for simultaneous viewing by the user.

16. An apparatus in accordance with claim 15 wherein said disposing means comprises a lighted tray.

17. An apparatus in accordance with claim 16 wherein said lighted tray comprises means for disposing transparencies between said lighting means and user.

18. An apparatus in accordance with claim 1 wherein said display means comprises advancing means for consecutive viewing of more than one transparency.

19. An apparatus in accordance with claim 18 wherein said advancing means comprises a VIEW-MASTER-type binocular viewing device.

20. An apparatus in accordance with claim 1 wherein said display means further comprises transparency storage means.

21. An apparatus in accordance with claim 1 wherein said display means comprises binocular means for three-dimensional viewing.

22. An apparatus in accordance with claim 21 wherein said binocular viewing means comprises a VIEW-MASTER-type device.

23. A method for simulating the visual effects of wearing preselected specialized eyeglasses comprising the steps of:
   a) selecting at least one non-refractive specialized eyeglass lens from the group consisting of polarized lens, color-tinted lens, partially tinted lens, photoreactive lens, and neutral lens;
   b) providing the user with at least one transparency of an appropriate subject photographed with at least one specialized eyeglass lens;
   c) illuminating the transparency for visual inspection by the user; and
   d) displaying the transparency for visual inspection by the user.

24. The method of claim 23 wherein the step of providing the user with the transparency comprises the step of providing the user with a mounted slide.

25. The method of claim 24 wherein the step of providing mounted slide to the user comprises providing slides mounted in a VIEW-MASTER disk to the user.

26. The method of claim 23 wherein the step of providing a transparency of an appropriate subject comprises preselecting the appropriate subject based on a user characteristic.

27. The method of claim 26 wherein the step of preselecting the appropriate subject based on a user characteristic comprises selecting at least one appropriate subject from the group consisting of appropriate user subjects relating to age, user life-style, user vocation, user avocation, and user income level.

28. The method of claim 23 wherein the step of selecting at least one specialized eyeglass lens comprises selecting the lens based on a user characteristic.

29. The method of claim 28 wherein the step of selecting the lens based on a user characteristic comprises selecting at least one member from the group comprised of user age, user life-style, user vocation, user avocation, user income level, and user optic health.

30. The method of claim 23 wherein the step of providing the user with at least one transparency of an appropriate subject comprises providing the user with a transparency that simulates the effects of more than one specialized eyeglass lens.

31. The method of claim 23 wherein the step of providing the user with a transparency further comprises the step of matching the user to a transparency based on a user characteristic.

32. The method of claim 31 wherein the step of matching the user to a transparency based on a user characteristic comprises selecting at least one member from the group consisting of user age, user life-style, user vocation, user avocation, user income level and user optic health.

33. The method of claim 31 wherein the step of matching the user with the transparency is performed by the user.

34. The method of claim 31 wherein the step of matching of the user with the transparency further comprises the step of employing a lens selection aid.

35. The method of claim 34 wherein the step of employing a lens selection aid comprises selecting at least one system from the group consisting of a computer program, a written flowchart, a chart matrix, and a written questionnaire.

36. The method of claim 31 wherein the step of matching the user with the transparency is performed by the provider of the transparency.

37. The method of claim 23 wherein the step of providing the user with the transparency comprises the further step of providing the user with two or more transparencies for simultaneous viewing by the user.

38. The method of claim 23 wherein the step of providing the user with the transparency comprises the further step of providing the user with two or more transparencies for consecutive viewing by the user.

39. The method of claim 23 wherein the step of illuminating the transparency comprises disposing a light source behind the transparency so that the transparency is between the light source and the user.

40. The method of claim 23 wherein the step of displaying the transparency comprises the further step of locating the transparency between a light source and the user.

41. The method of claim 40 wherein the step of locating the transparency comprises the further step of disposing the transparency upon a light tray.

42. The method of claim 40 wherein the step of displaying the transparency comprises the further step of adjacently disposing more than one transparency for simultaneous viewing by the user.

43. The method of claim 23 wherein the step of displaying the transparency comprises the further step of advancing multiple transparencies for consecutive viewing by the user.

44. The method of claim 43 wherein the step of advancing multiple transparencies comprises the further step of utilizing a VIEW-MASTER-type device.

45. The method of claim 23 wherein the step of displaying the transparency comprises providing the user with storage means to store transparencies when not in use.

46. The method of claim 45 wherein the step of providing storage means to store transparencies comprises providing a bin in which to stack transparencies when not in use.

47. The method of claim 23 wherein the step of displaying the transparency comprises providing a binocular means for three-dimensional viewing.

48. The method of claim 23 wherein the step of displaying the transparency comprises providing lens identifying indicia.

49. The method of claim 48 wherein the step of displaying the transparency comprises the further step of providing lens identifying indicia on the transparency.

50. The method of claim 48 wherein the step of displaying the transparency comprises the further step of providing lens identifying indicia on a mount of the transparency.

51. A method for producing transparency images for use in simulating the visual effects of wearing specialized eyeglasses comprising the steps of;
   a) disposing at least one first preselected camera lens corresponding to a first specialized eyeglass lens upon a subject side of a camera lens;

b) photographing an image through the first preselected camera lens corresponding to the first specialized eyeglass lens with the camera;

c) replacing the first preselected camera lens with a second preselected camera lens corresponding to a second specialized eyeglass lens upon the subject side of the camera lens;

d) photographing the image through the second preselected camera lens corresponding to the second specialized eyeglass lens with the camera; and e) producing transparencies of the photographed images for comparison of the effects of the first and second preselected camera lenses corresponding to the first and second specialized eyeglass lenses.

52. The method of claim 51 wherein the step of disposing at least one first preselected camera lens corresponding to a first eyeglass lens comprises matching the beneficial optical feature of the first eyeglass lens with the existing environmental lighting conditions.

53. The method of claim 51 wherein the step of disposing at least one first preselected camera lens corresponding to a first eyeglass lens comprises selecting the first preselected camera lens based on a user characteristic.

54. The method of claim 53 wherein the step of selecting the first preselected camera lens based on a user characteristic comprises selecting at least one member from the group-consisting of user age, user life-style, user vocation, user avocation, user income, and user optic health.

55. The method of claim 51 wherein the step of disposing at least one first preselected camera lens corresponding to a first eyeglass lens comprises simultaneously disposing multiple preselected camera lenses corresponding to various eyeglass lenses upon the subject side of the camera lens.

56. The method of claim 51 herein the step of replacing the first preselected camera lens with a second preselected camera lens corresponding to a second eyeglass lens comprises selecting a second preselected camera lens corresponding to a second eyeglass lens having a different beneficial optical characteristic from the first eyeglass lens.

57. The method of claim 56 wherein the step of selecting a second preselected camera lens comprises selecting a second preselected camera lens corresponding to the absence of any eyeglass lens.

58. The method of claim 51 wherein the step of producing transparencies of the photographed images comprises employing consistent photographic techniques for developing images on transparencies.

* * * * *